United States Patent
Tucker

(10) Patent No.: US 7,600,037 B2
(45) Date of Patent: Oct. 6, 2009

(54) REAL TIME TRANSMISSION OF INFORMATION CONTENT FROM A SENDER TO A RECEIVER OVER A NETWORK BY SIZING OF A CONGESTION WINDOW IN A CONNECTIONLESS PROTOCOL

(75) Inventor: Rusty Tucker, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 11/374,091

(22) Filed: Mar. 14, 2006

(65) Prior Publication Data
US 2006/0155870 A1 Jul. 13, 2006

Related U.S. Application Data

(62) Division of application No. 09/680,990, filed on Oct. 6, 2000, now Pat. No. 7,013,346.

(51) Int. Cl.
*G06F 15/16* (2006.01)
(52) U.S. Cl. .................. 709/235; 709/227; 709/230; 370/229; 370/231
(58) Field of Classification Search .......... 709/230–235; 370/229–232
See application file for complete search history.

(56) References Cited

U.S. PATENT DOCUMENTS

| | | | |
|---|---|---|---|
| 5,751,970 A | 5/1998 | Bournas | |
| 5,768,533 A | 6/1998 | Ran | |
| 5,905,871 A | 5/1999 | Buskens et al. | |
| 6,014,707 A | 1/2000 | Miller et al. | |
| 6,038,606 A | 3/2000 | Brooks et al. | |
| 6,125,398 A | 9/2000 | Mirashrafi et al. | |
| 6,178,450 B1 * | 1/2001 | Ogishi et al. | 709/235 |
| 6,192,412 B1 | 2/2001 | Cantoral et al. | |
| 6,201,791 B1 | 3/2001 | Bournas | |
| 6,212,171 B1 | 4/2001 | LaFollette et al. | |
| 6,236,642 B1 | 5/2001 | Shaffer et al. | |
| 6,247,058 B1 | 6/2001 | Miller et al. | |
| 6,252,848 B1 | 6/2001 | Skimont | |
| 6,452,579 B1 | 9/2002 | Itoh et al. | |
| 6,473,425 B1 | 10/2002 | Bellaton et al. | |
| 6,501,441 B1 | 12/2002 | Ludke et al. | |
| 6,505,253 B1 | 1/2003 | Chiu et al. | |
| 6,560,243 B1 * | 5/2003 | Mogul | 370/229 |
| 6,564,267 B1 | 5/2003 | Lindsay | |
| 6,574,668 B1 | 6/2003 | Gubbi et al. | |

(Continued)

OTHER PUBLICATIONS

Allman et al, RFC 2581, Apr. 1999, Network Working Group.*

(Continued)

*Primary Examiner*—Ramy Mohamed Osman
(74) *Attorney, Agent, or Firm*—Buchanan Ingersoll & Rooney PC

(57) ABSTRACT

A stream of packets is started at a slow rate to enable competing streams to achieve transmission rate equilibrium. The transmission window is initialized to a size smaller than an acceptable window advertised by the receiving client. Upon receipt of an acknowledgement from the client that a packet has been successfully transmitted, the size of the transmission window is increased by the size of the acknowledged packet. This increase continues until a threshold is reached, at which time further increases are constrained by the maximum permitted segment size.

15 Claims, 2 Drawing Sheets

U.S. PATENT DOCUMENTS

| | | | |
|---|---|---|---|
| 6,593,937 | B2 | 7/2003 | Ludtke et al. |
| 6,611,495 | B1 | 8/2003 | Meyer et al. |
| 6,621,799 | B1 | 9/2003 | Kemp et al. |
| 6,622,172 | B1 * | 9/2003 | Tam ............................ 709/232 |
| 6,643,259 | B1 * | 11/2003 | Borella et al. ............... 370/231 |
| 6,744,730 | B2 * | 6/2004 | Le et al. ..................... 370/229 |
| 6,750,841 | B2 | 6/2004 | Itoh et al. |
| 6,842,424 | B1 * | 1/2005 | Key et al. ................... 370/236 |
| 6,954,797 | B1 * | 10/2005 | Takeda et al. ............... 709/236 |
| 6,958,997 | B1 * | 10/2005 | Bolton ....................... 370/392 |
| 7,013,346 | B1 * | 3/2006 | Tucker ....................... 709/235 |
| 7,035,214 | B1 * | 4/2006 | Seddigh et al. ............. 370/231 |
| 2006/0155870 | A1 * | 7/2006 | Tucker ....................... 709/235 |

OTHER PUBLICATIONS

Jacobson, et al, Congestion Avoidance and Control, Nov. 1988.*

Stevens, Richard, "TCP/IP Illustrated", 1995, Addison-Wesley, vol. 1, pp. 285-292.*

Jain, Raj, "Timeout Based Congestion Control Scheme", Oct. 1986, IEEE Journal on Selected Areas in Communications, vol. SAC-4 No. 7, pp. 1162-1167.*

Wikipedia, "Slow Start", http://en.wikipedia.org/wiki/Slow-start, accessed on Nov. 5, 2008.*

Inwhee Joe, "A novel adaptive hybrid ARQ scheme for wireless ATM networks", ACM/IEEE MobiCom '97 Conference, Budapest Hungary, Sep. 1987, pp. 211-219.

* cited by examiner

REAL TIME TRANSMISSION OF INFORMATION CONTENT FROM A SENDER TO A RECEIVER OVER A NETWORK BY SIZING OF A CONGESTION WINDOW IN A CONNECTIONLESS PROTOCOL

This application is a divisional of application Ser. No. 09/680,990, filed Oct. 6, 2000 now U.S. Pat. No. 7,013,346.

FIELD OF INVENTION

The present invention relates generally to protocols for the transmission of packets over a computer network, and more particularly, to an improved connectionless protocol.

BACKGROUND OF THE INVENTION

In a computer network in which a plurality of clients communicate with one or more servers, a protocol is necessary to establish the rules by which the information is transmitted to effect such communication. Generally, the information is sent from the server in successive packets of information, with each of the packets transversing their own paths through the network, until such time as the packets are reassembled at the destination client. To establish the communication, each packet contains, in addition to a data segment of the total information to be sent, the source address of the server in the network and the destination address of the client in the network.

A commonly used protocol used to establish these connections is the Transmission Control Protocol ("TCP"). TCP is used along with the Internet Protocol ("IP") to send data in the form of message units between computers over the Internet. While IP takes care of handling the actual delivery of the data, TCP takes care of keeping track of the packets that a message is divided into for efficient routing through the Internet.

For example, when an HTML file is sent from a web server, the TCP program layer in that server divides the file into one or more packets, numbers the packets, and then forwards them individually to the IP program layer. Although each packet has the same destination IP address, each packet may get routed differently through the network. At the client, TCP reassembles the individual packets and waits until they have arrived to display the re-assembled HTML file.

TCP is also known as a connection-oriented protocol, which means that a connection is established and maintained until such time as the message or messages to be exchanged by the application programs at each end of the connection have been exchanged. TCP is responsible for ensuring that a message is divided into the packets that IP manages and for reassembling the packets back into the complete message at the other end.

Another protocol to transmit information is the User Datagram Protocol ("UDP"). UDP is a communications method that offers a limited amount of service when messages are exchanged between computers in a network that uses IP. UDP is an alternative to TCP and, together with IP, is sometimes referred to as UDP/IP. Like TCP, UDP uses the IP to actually get a data unit, or datagram, from one computer to another.

Unlike TCP, however, UDP does not provide the service of dividing a message into packets or datagrams, and reassembling them at the other end. Specifically, UDP does not provide sequencing of the packets that the data arrives in. Accordingly, the application program that uses UDP must be able to ascertain that the entire message has arrived and is in the right order. Network applications that want to save processing time because they have very small data units to exchange (and therefore very little message reassembling to do) may usually use UDP instead of TCP. UDP does provide two services not provided by the IP layer. It provides a port number to help distinguish different user requests and, optionally, a checksum capability to verify that the data arrived intact.

For streaming applications over a computer network, both UDP and TCP have significant disadvantages and limitations. For example, since TCP requires that all packets are received prior to reassembly at the client, any missing packets could cause the streaming application running at the client to be paused due to the lack of data. UDP also requires that all of the packets are received and also received in the right order, since there is no sequencing of the packets. For a large number of packets in a streaming application, the packets may arrive out of order, resulting in degradation of the output of the streaming application.

Other features of TCP further disadvantageously limit the ability to deliver packets for streaming applications in a timely manner. For example, TCP requires that each packet sent in the stream must be received and each packet delivered to the client in the order sent. This requirement of TCP is especially limiting and disadvantageous for a streaming application. If the server sends four sequential packets, and packet 1 is lost, the client running the streaming application cannot receive the remaining three packets from the TCP protocol stack until it receives the first packet. If the client receives the first packet sufficiently late, all the previously received packets may be useless due to the tardy reception. In any event, the output of the streaming application will be degraded or possibly halted.

There is therefore needed a connectionless protocol which overcomes one or more disadvantages and limitations of the prior art herein above enumerated.

SUMMARY OF THE INVENTION

It is an object of the present invention to overcome one or more disadvantages and limitations of the prior art herein above enumerated.

It is an object of the present invention to provide a conectionless protocol which does not require receipt of all packets by the client, nor require receipt of packets in order of transmission.

According to one aspect of the present invention, a method for real time transmission of information content between a network server and a network client comprises the steps of transmitting successive packets of the content from the server to a retransmit module, assigning at the retransmit module to each of the packets a sequence number and a first timer, transmitting further each of the packets from the retransmit module to the network client, transmitting from the network client to the retransmit module an acknowledgment for each of the packets received at the network client, retransmitting from the retransmit module any of the packets upon expiration of the first timer assigned thereto prior to an acknowledgment for the any one of the packets being received, and removing from the retransmit module any of the packets upon an event determination prior to an acknowledgement for such anyone of the packets being received.

In a second aspect of the present invention, a method for acknowledging receipt of packets sent from a network server to a network client comprises steps of transmitting successively packets from the server, receiving at the client several of the packets, placing into a coalesced acknowledgment an ID of a first one of the several of the packets received at the client, adding to the coalesced acknowledgment a bit map identifying selected other ones of the several of the packets received at the client, and transmitting to the server the coalesced acknowledgment.

Features of the present invention are flow control, congestion avoidance and packet recovery without any necessity for guaranteed or in order delivery. Flow control is achieved by limiting the amount of unacknowledged data to a given window size. When the window is full, further transmission is delayed until packets are acknowledge or expired. A slow start algorithm is also provided to adapt the rate of packet transmission to the client. Congestion is avoided by using the TCP exponential back off. Robust packet recovery is obtained by using Karn's algorithm for round trip estimation. The order of packet deliver is not required nor guaranteed. Acknowledgments are sent on a packet by packet basis. In another embodiment of the invention, acknowledgments may be coalesced.

These and other objects, advantages and features of the present invention will become readily apparent to those skilled in the art from a study of the following Description of the Exemplary Preferred Embodiments when read in conjunction with the attached Drawing and appended Claims.

DESCRIPTION OF THE EXEMPLARY PREFERRED EMBODIMENTS

Figures 1, 2:
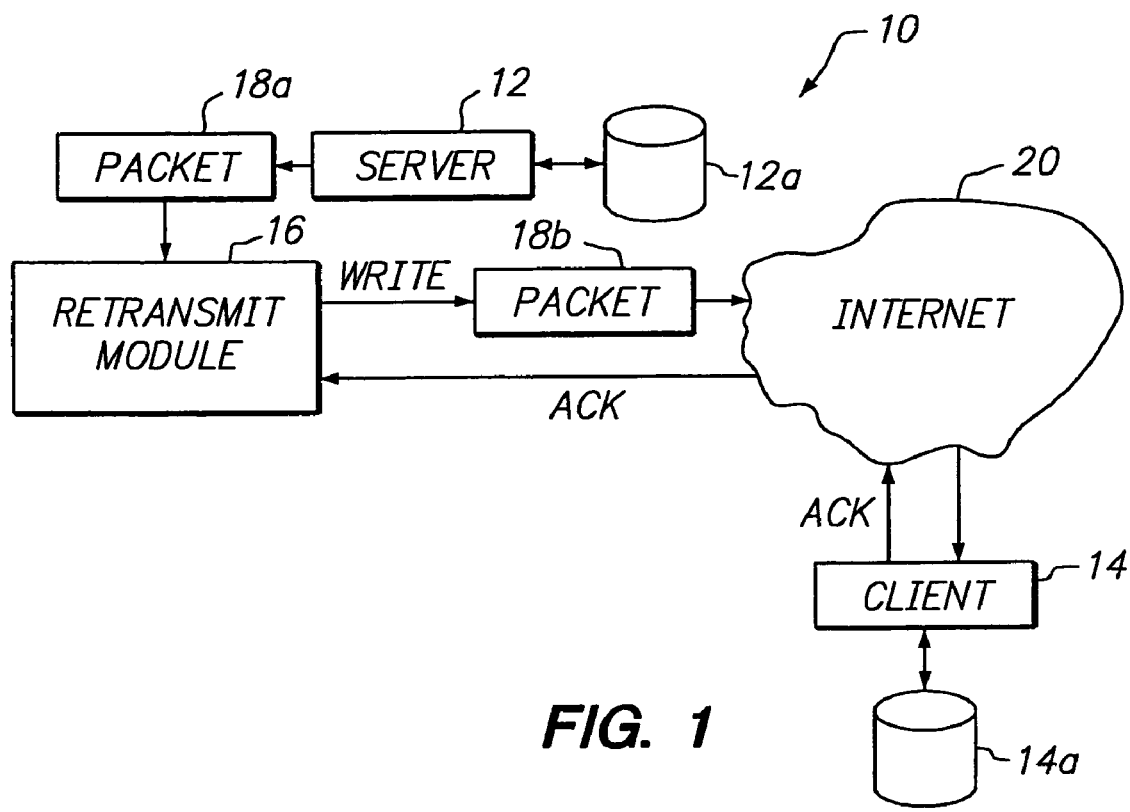
FIG. 1 is a schematic block diagram of a computer network constructed according to the principles of the present invention.
FIG. 2 is a table useful to describe the function of the retransmit module of FIG. 1.

With reference to FIG. 1, there is shown a network 10 including a server 12, a client 14, and a retransmit module 16. The server is adapted to send successive packets, such as packets 18a, 18b, into the network 10. The client 14 is adapted to receive such packets 18a, 18b, from the network 10. As is known, the packets 18a and 18b may traverse differing paths through the Internet 20, which may also be part of the network 10. Each of the server 12 and client 14 respectively has a computer readable medium 12a, 14a in which a program is stored which implements the below described inventive procedures, processes and methods.

Figure 3:
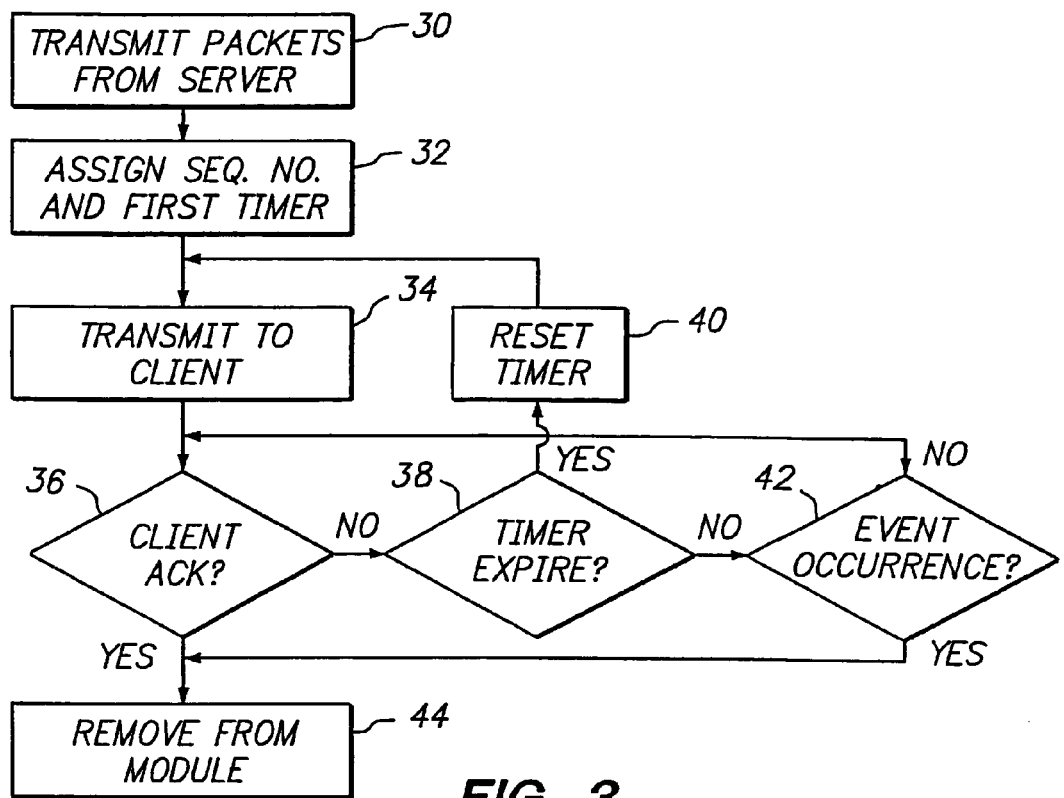
FIG. 3 is a flow chart useful to describe one method of the present invention.

In accordance with the present invention, the packets are first sent from the server to the retransmit module 16 as seen at 30, 32 in FIG. 3. The retransmit module 16 assigns a sequence number or ID to each packet, a first timer and second timer as best seen in the table of FIG. 2. The first timer establishes a first time duration, or retransmit time, upon the expiration of which the packet 18a, 18b to which it is assigned is retransmitted. The second timer establishes a "time to live" for the packet 18a, 18b, to which it is assigned. Upon expiration of the second timer, the packet 18a, 18b to which it is assigned is removed from the retransmit module 16 even if no acknowledgement for receipt of such packet 18a, 18b has been received.

When the packets 18a, 18b are sent to the retransmit module, they are retained therein, as well as transmitted through the network 10 as seen at 34 in FIG. 3. If an acknowledgment (ACK) is not returned as indicated in 36 to the retransmit module 16 for any of the packets 18a, 18b, prior to the expiration of the first timer associated therewith, indicated at 38, such packet 18a, 18b will be retransmitted, and the first timer for the retransmit time may also be reset as indicated at 40.

Although it has been described above that, if an acknowledgment is not received for such packet 18a, 18b prior to the expiration of the second timer for the time to live, the packet will be removed from the retransmit module 16, several other methods or procedures may be utilized. For example, the packet 18a, 18b may be removed from the retransmit module upon the occurance of a predetermined event prior to receipt of any acknowledgement therefor as indicated at 42. Such event may be a preselected number of retransmits for such packet 18a, 18b, or the subsequent transmission of another packet containing more critical information, as discussed herein below. If an acknowledgment is received prior to the expiration of either timer, the packet will also be removed from the retransmit module 16, as indicated at 44.

In one embodiment of the present invention, the first timer and the second timer may be assigned on the basis of the criticality of the information contained in the packet. For example in a streaming video application, certain packets may be designated as frame packets necessary for reconstructing an entire video frame at the client 14. Successive packets following the frame packets may then be designated as differential packets, which contain only information which has changed within the frame. Differential packets may then be given shorter time to live than frame packets which contain more valuable information for the streaming application. By allowing packets to expire, the stream of packets keeps moving forward. Rather than retransmit a stale packet, a fresher and potentially more important packet is transmitted in its place. The expiration of the stale packet could be based either on the time to live associated with the second timer, or alternatively, on the event of a subsequent frame packet being transmitted, for example.

In another aspect of the present invention, the stream of packets 18a, 18b, is regulated, or slowly started, to increase the allowable window size so that competing streams can find equilibrium in their transit rate when they are first starting up, and also when a retransmit occurs. This slow start is effective to minimize the number of lost packets by keeping total bandwidth demand within the bandwidth constraints along the path between the server 12 and the client 14.

While a stream is sending, the window size is constrained to the lesser of a "Congestion Window", or CWND and client window sizes. The client window must be advertised using RTSP during protocol negotiation. The size must be no greater than the size of the UDP socket input buffer at the client 14. CWND is initialized to the maximum segment size (MSS).

For each packet 18a, 18b acknowledged by the client, CWND is increased by the sized of the acknowledged packet 18a, 18b. CWND is continually increased for each acknowledgment until the CWND is greater than or equal to a predetermined slow start threshold (SSTH). Once the SSTH is reached, the CWND is increased by the MSS for each window of ACK's.

CWND may be constrained by the MSS at the minimum and the client window size at the maximum. SSTH is maintained by an exponential back off algorithm. It denotes the window size that is last known to be error free. An exemplary code listing for the slow start algorithm is set forth herein in Table 1.

TABLE 1

SAMPLE CODE TO CALCULATE CONGESTION WINDOW:

```
void UpdateCongestionWindo ( Sint32 bytesIncreased )
{
    // update the congestion window by the number of bytes just
acknowledged.
    if ( fCongestionWindow > = fSlowStartThreshold )
    {
        // when we hit the slow start threshold, only increase the
        // window for each window full of acks.
        fSlowStartByteCount + = bytesIncreased;
        // have we exceeded one window full yet?
        if (fSlowStartByteCount > fCongestionWindow )
        {
            fCongestionWindow + = kMaximumSegmentSize;
            fSlowStartThreshold + = kMaximumSegmentSize;
            fSlowStartByteCount = 0;
        }
    }
    else
        fCongestionWindow + = bytesIncreased;
    if ( fCongestionWindow > fClientWindow )
        fCongestionWindow = fClientWindow;
}
```

The timer for retransmit time (RTO) is calculated as a modified version of Karn's algorithm used in TCP. The round trip time for each acknowledged packet 18a, 18b is input into an estimator to produce a smoothed round trip time (SRTT) and a running standard deviation (RTTVAR). The retransmit formula is the sum of the smoothed round trip time and four times the standard deviation, or RTO=SRTT+4*RTTVAR. In addition, one and one half times the RTO as a sample of the first retransmit of any given packet may be initially used to prevent spurious retransmits of any packets when the actual round trip time is increasing rapidly. furthermore, acknowledgments for packets that have been retransmitted are usually not used for packets that have been retransmitted. A listing of exemplary code useful for this aspect of the present invention is set forth in Table 2.

TABLE 2

SAMPLE CODE FOR MAKING SRTT
AND RTTVAR CALCULATIONS

```
void AddToEstimate ( Sint32 rttSampleMSecs )
{
*/
    Sint32 delta;
    // initialize avg to cur sample, scaled by 2**3
        if ( fRunningAverageMSecs = = 0 )
            fRunningAverageMSecs = rttSamplMSecs * 8;
        // scale average back to get cur delta from sample
        delta = rttSampleMSecs − fRunningAverageMSecs / 8
        // add 1/8 the delta back to the smooth runnin
        average
        //same as : rt avg = rt avg + delta / 8, but scaled
        fRunningAverageMSecs = fRunningAverageMSecs +
        delta ;
        if ( delta < 0 )
            delta = −1*delta; // absolute value
        /*
            fRunningMeanDevationMSecs is kept scaled by 4
            so this is the same as
            fRunningMeanDevationMSecs =
fRunningMeanDevationMSecs + ( |delta| −
fRunningMeanDevationMSecs ) /4;
                    fRunningMeanDevationMSecs + = delta −
fRunningMeanDevationMSecs / 4;
        */
            fRunningMeanDevationMSecs + = delta −
fRunningMeanDevationMSecs / 4;
        fCurRetransmitTimeout = fRunningAverageMSecs / 8 +
```

TABLE 2-continued

SAMPLE CODE FOR MAKING SRTT
AND RTTVAR CALCULATIONS

```
fRunningMeanDevationMSecs;
    // rto should not be too low . . .
    if ( fCurRetransmitTimeout < kMinRetransmitIntervalMsecs )
        fCurRetrasnsmitTimeout = kMinRetrnsmitIntervalMSecs;
    // or too high . . .
    if ( fCurRetransmitTimeout > kMaxRetransmitIntervalMSecs )
        fCurRetransmitTimeout = kMaxRetransmitIntervalMSecs;
}
```

An inverse to the above described slow start, is back off to quickly slow and find a new equilibrium when a retransmit of any packet occurs. After a retransmit, SSTH is set to a maximum of one half the current CWND or MSS. After adjusting the SSTH, CWND is set to the MSS. When a stream begins retransmitting, it will not readjust the CWND or SSTH because of subsequent retransmits until either a new packet is sent, or packets are acknowledged. Accordingly, the back off prevents a burst of retransmits from closing the windows to unnecessarily low levels.

The client 14 acknowledges each packet successfully received using an RTCP app packet. A PTCP app packet useful for practicing the above described methods and procedures is exemplary set forth in Table 3.

TABLE 3

SENDING ACKOWLEDGEMENTS -
The client acknowledges each RTP packet successfully
received using the following RTCP app packet:

| # bytes | descriptions |
|---|---|
| 4 | rtcp header |
| 4 | SSRC of receiver |
| 4 | app type ("AAAA') |
| 2 | reserved (set of 0) |
| 2 | seqNum |

Acknowledgments need not be sent for each packet 18a, 18b received at the client 14, but may be combined into a coalesced acknowledgment. In one embodiment a coalesced acknowledgment may be a four bit bitmap following the sequence number of the first acknowledge packet, such that the coalesced acknowledgment could acknowledge up to 33 packets. A coalesced acknowledgment has the advantage of reducing demand for bandwidth in the client 14 to server 12 direction, and reduce processing load at the server 14.

Coalesced acknowledgments will be sent whenever the bitmap is full, the sequence numbers "wrap" (restarting at the first sequence number) or whenever a selected time, such as 200 ms, have elapse since the previous acknowledgment and the client 14 has unacknowledged packets. This keeps the round-trip time from becoming artificially large, which may result in unneeded retransmits or lower throughput. Furthermore, the client 14 should send an acknowledgment whenever a packet is received out of sequence.

Figure 4:
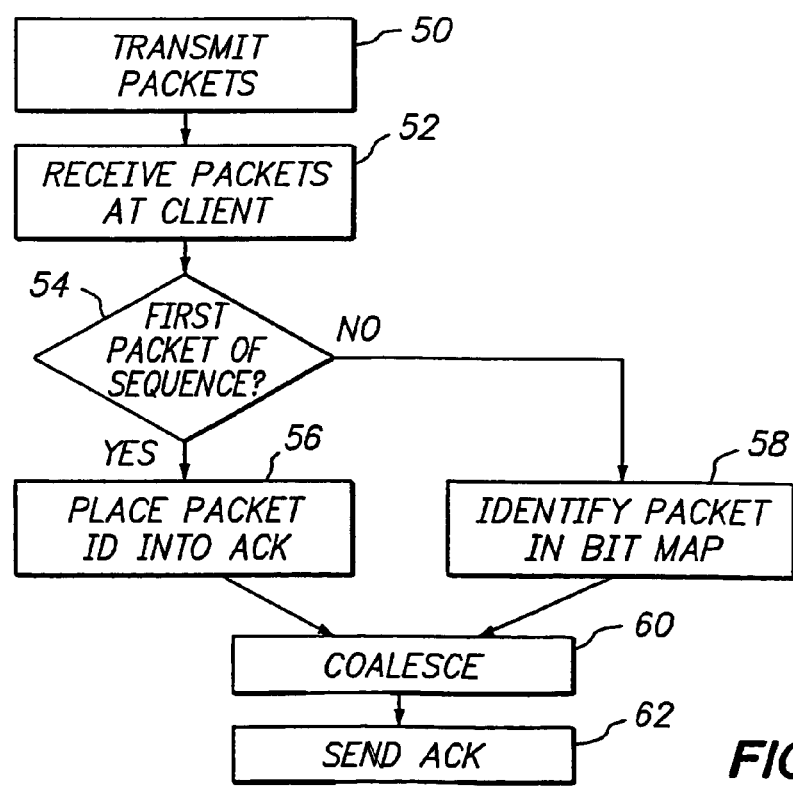
FIG. 4 is a flow chart useful to describe another method of the present invention.

As seen in FIG. 4, the packets may be transmitted and received, as seen at 50, 52. At 54 a determination is made if the received packet is the first of a sequence. If yes, its ID is placed into the acknowledgement, as indicated at 56. If no, the packet is identified in a bitmap, as indicated at 58. If an acknowledgment is then to be sent in accordance with one of the above conditions, the acknowledgment is coalesced, as indicated at 60 and sent to the server 12, as indicated at 62.

There has been described herein above exemplary preferred embodiments of an improved connectionless protocol. Those skilled in the art may now make numerous uses of and departures from the above described embodiments without departing from the inventive concepts disclosed therein. Accordingly, the present invention is to be defined solely by the scope of the appended Claims.

What is claimed is:

1. A computer-implemented method for real time transmission of information content from a sender to a receiver over a network, comprising the following steps:
   defining an initial size for a congestion window that establishes a number of successive packets of information that can be transmitted by said sender without acknowledgment from the receiver;
   transmitting the number of packets established by the congestion window;
   upon detecting acknowledgment of a packet from the receiver, increasing the size of the congestion window by the size of the acknowledged packet; and
   continuing to increase the size of the congestion window by the size of an acknowledged packet for each detected acknowledgment until an established threshold is reached.

2. The method of claim 1 including the step of further continuing to increase the size of the congestion window by a maximum segment size after said threshold is reached for each window of acknowledgments received.

3. The method of claim 2 including the step of limiting the size of the congestion window to a maximum window size established by the receiver.

4. The method of claim 1 wherein said initial size is equal to a maximum segment size for communication between the sender and the receiver.

5. The method of claim 1 wherein said threshold is equal to a window size that was last known to be error free.

6. A computer-readable medium containing a computer program stored thereon for execution by a processor that executes the following steps:
   defining an initial size for a congestion window that establishes a number of successive packets of information that can be transmitted by said sender without acknowledgment from the receiver;
   transmitting the number of packets established by the congestion window;
   upon detecting acknowledgment of a packet from the receiver, increasing the size of the congestion window by the size of the acknowledged packet; and
   continuing to increase the size of the congestion window by the size of an acknowledged packet for each detected acknowledgment until an established threshold is reached.

7. The computer-readable medium of claim 6 including the step of further continuing to increase the size of the congestion window by a maximum segment size after said threshold is reached for each window of acknowledgments received.

8. The computer-readable medium of claim 7 including the step of limiting the size of the congestion window to a maximum window size established by the receiver.

9. The computer-readable medium of claim 6 wherein said initial size is equal to a maximum segment size for communication between the sender and the receiver.

10. The computer-readable medium of claim 6 wherein said threshold is equal to a window size that was last known to be error free.

11. A computer server that transmits real time of information content to a client over a network, and that performs the following functions:
    transmitting a number of packets of information that are defined by a congestion window that establishes a number of successive packets of information that can be transmitted without acknowledgment from the client;
    upon detecting acknowledgment of a packet from the client, increasing the size of the congestion window by the size of the acknowledged packet; and
    continuing to increase the size of the congestion window by the size of an acknowledged packet for each detected acknowledgment until an established threshold is reached.

12. The server of claim 11 that performs the further function of continuing to increase the size of the congestion window by a maximum segment size after said threshold is reached for each window of acknowledgments received.

13. The server of claim 12 that performs the function of limiting the size of the congestion window to a maximum window size established by the client.

14. The server of claim 11 wherein said congestion window has an initial size equal to a maximum segment size for communication between the server and the client.

15. The server of claim 11 wherein said threshold is equal to a window size that was last known to be error free.

* * * * *

UNITED STATES PATENT AND TRADEMARK OFFICE
CERTIFICATE OF CORRECTION

PATENT NO.         : 7,600,037 B2
APPLICATION NO. : 11/374091
DATED                  : October 6, 2009
INVENTOR(S)       : Rusty Tucker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this

Fifth Day of October, 2010

David J. Kappos
*Director of the United States Patent and Trademark Office*